3,067,134
INHIBITION OF DEPOSITION OF HYDRO-
CARBONACEOUS SOLIDS FROM OIL
Christ F. Parks and Jacob E. Strassner, Tulsa, Okla., and Fred W. Burtch, Monroeville, Pa., assignors to The Dow Chemical Company, Midland, Mich., a corporation of Delaware
No Drawing. Filed Apr. 28, 1960, Ser. No. 25,220
7 Claims. (Cl. 252—8.3)

The invention is concerned with lessening the adhesion of hydrocarbonaceous deposits from oil, e.g., crude oil and its derivatives, deposited on the surface of equipment which is contacted by the oil.

The adhesion and accumulation of hydrocarbonaceous solids on the walls of oil-producing and oil-handling equipment has long been recognized as a major problem in the production, transfer, storage, and processing of petroleum and petroleum products. Although the invention is concerned with any equipment contacted by oil and, therefore, includes any surface affected thereby, e.g., the walls of metal tubing, pipe lines, pumping assemblies, valves, gauges, and storage tanks, for simplicity of expression such equipment hereinafter will be usually referred to as vessels.

Oil, as it first comes into contact with a restraining wall, e.g., the interior of a confining vessel, often contains certain hydrocarbonaceous substances which are in solution or otherwise flowable at the time of such first contact but subsequent thereto and prior to termination of the contact therewith are converted to non-flowable substances. Such substances are often deposited on the walls and form a tenaceous bond therewith and thereafter must be removed therefrom at considerable cost, inconvenience and lost time from production.

Although the character of the adhering deposit thus formed on the interior of the vessels varies somewhat, it consists largely of solidified hydrocarbons which have undergone a change of state from liquid to solid during a drop in temperature or rate of flow, or other altered condition which occurs during the contact with the walls of the vessel together with lesser amounts of substituted hydrocarbons, occluded oil, entrained water, sand, silt, and traces of other inorganic substances. The hydrocarbons are chiefly aliphatic (boht straight and branched chain) aromatic, naphthenic, asphaltic, and small amounts of various resins. Because paraffin composes the largest percent of such hydrocarbonaceous depositions, they are often referred to broadly as paraffin wax, paraffin, or "rod wax." Paraffin wax is considered to have a melting point of between about 110° and 160° F. However, the paraffin waxes usually have intermixed therewith sufficient other waxes and resins which have higher molecular weight, longer length carbon atom chains per molecule, and higher average melting points (say of from about 150° to 200° F.) that the depositions have imparted thereto a particularly adhesive property. Such other waxes, often referred to broadly as resins, usually contain some complex molecular structures including oxygen, nitrogen, and sulfur combined therewith. The presence of such complex structures often render them particularly resistant to removal from the walls of the vessels to which they adhere.

Although a change in temperature is considered a fundamental cause for the deposition of hydrocarbonaceous solids, other factors are thought to contribute to such deposition, among which are: alternate coating and draining of oil from a surface, change in flow rate, change in agitation, presence of sand, silt, and water, roughness or smoothness of the confining surface, expansion of the more volatile constituents of the oils, liberation of such volatile constituents from the oil, change in viscosity of the oil, and conditions (not too fully understood) that appear to encourage crystal growth of the paraffin and other solid hydrocarbonaceous substances, present in the oil, on the surfaces with which the oil comes in contact. Hydrocarbonaceous deposits may be removed from surfaces by scraping with especially designed instruments, the procedure sometimes being referred to as "knifing." They may also be removed by passing hot oils, e.g., at a temperature of between 300° and 400° F., through the vessels from which the deposit is sought to be removed. Aside from the scraping being a particularly time-consuming and tedious task and the hot oil flush representing considerable cost in heating, pumping, and the like, neither method offers any prevention to the accumulation and continued formation of such deposits after such cleaning operation. The inconvenience and cost of such hydrocarbonaceous solid removal must be repeated at frequent intervals which makes their formation an especially serious problem.

Remedial measures have been proposed and tried for rendering the walls of vessels contacted by oil less susceptible to the deposition of hydrocarbonaceous substances contained in the oil on the walls. Such measures have, at best, only been partially satisfactory due to ineffectiveness, costs, delayed production, or other circumstances attendant upon such attempted remedial measures.

There is a desideratum, therefore, in the production, transportation, storage, and processing of oil, for a satisfactory process for inhibiting the formation of adhering hydrocarbonaceous solids on the walls of vessels contacted by oil.

The present invention is a method, of inhibiting the adhesion of solid hydrocarbonaceous substances on deposition-susceptible walls of vessels used for confining oil containing such substances, consisting of first rendering the surface of said walls water-wettable either by blowing steam against the surface thereof or by flushing the surface with an alkaline aqueous solution and then contacting the thus water-wet walls with a small but effective amount of an alkaline aqueous dispersion of quebracho. The walls may be so contacted by such dispersion: (1) prior to confining oil therein, (2) while in use by adding a small amount of the dispersion to the oil to be so confined, or (3) contacting the surface prior to use and then periodically after being put in use, adding additional amounts of the dispersion to the oil.

Quebracho is the dried wood or bark, or dried extract of such wood or bark, obtained from the aspidosperma quebracho blanco or the quebracho lorentzii tree. Quebracho is readily available commercially.

The alkaline aqueous dispersion of quebracho employed in the practice of the invention has a pH value of at least 7.5 and preferably between 9 and 14 and contains quebracho in an amount between 0.05 and 1.0 percent by weight of the dispersion. The pH is satisfactorily adjusted by admixing therewith a substance yielding OH ions in solution, e.g., NaOH.

The walls of the vessel or other equipment to be treated according to the invention to inhibit the adherence thereto of hydrocarbonaceous materials may already be coated with hydrocarbonaceous material. In such instances, the hydrocarbonaceous material must be first removed by known means, e.g., scraping it off by the use of knives or subjecting it to hot-oil at a temperature from about 200° to 400° F. to dissolve said material and flushing out the oil containing the dissolved hydrocarbonaceous substances. After thus removing all or at least a substantial portion of adhering hydrocarbonaceous material, the surfaces to be treated are rendered water-wet in the manner aforesaid.

One embodiment of the invention includes putting the equipment back into use and, subsequent thereto, at periodic intervals, e.g., every 12 to 72 hours, and usually 24 to 48 hours, introducing into the oil contacting the surface of said equipment or vessel a small amount of an aqueous alkaline dispersion of quebracho. The amount of such aqueous dispersion to be added varies considerably, being dependent upon the concentration of the dispersion, the type of oil, the changes which the oil undergoes while in contact with the walls of the vessel, whether or not the oil is substantially static as in a tank or is moving as in a well tubing or pipe line wherein, as a usually consequence of such movement, oil in contact with a given section of the vessel is more-or-less continuously replaced by other oil. As little as one gallon of the aqueous alkaline quebracho dispersion, having a suitable pH value and a concentration of about 0.1 percent in water, per 100 barrels of oil, when the oil is essentially static, is effective. In the case of moving oil, as oil in the tubing of a well producing about 100 barrels of oil per day, 1 gallon of 0.1 percent concentration of such aqueous quebracho dispersion per day is effective. Between 0.2 and 20 gallons of the aqueous quebracho dispersion, containing between 0.1 and 2.5 pounds of quebracho per gallon per 100 barrels of oil per day, is recommended. A barrel, as used herein, equals a volume of 42 gallons. As illustrative of the practice of the invention, between about 1 and 3 gallons of the aqueous dispersion containing between 1 and 2 pounds of the quebracho per gallon may be admixed per 100 barrels of oil.

To illustrate the practice of the invention, alkaline aqueous dispersions were prepared and tested for their efficacy in inhibiting the deposition of paraffin from portions of paraffin-containing crude oil on metal treated in accordance with the invention in contact with such oil. Deposition of paraffin from other portions of the same crude oil on metal which has not been treated in accordance with the invention was ascertained for purposes of comparison.

The test for ascertaining efficacy of treatment according to the invention employed the following apparatus:

(1) A hollow steel cylinder, 1 inch in diameter and 6 inches long, closed at one end and open at the other end, was marked circumferentially a distance of about 3 inches from the closed end to set off a specific exterior surface. The cylinder was provided with a 3-hole stopper in the open end. One of such holes contained a thermometer, a second an inlet tube, and the third an outlet tube. The inlet tube was adapted to be connected to an exterior constant-temperature water reservoir and a pumping arrangement in series for providing water to the cylinder. The outlet tube was adapted to be connected to the same water reservoir for the purpose of returning water from the cylinder to the reservoir for heating.

(2) A 3-liter flask, provided with three openings in the top thereof, one opening in the center and two outer openings spaced radially therefrom, was placed in a contant temperature bath, into one of the outer openings was inserted a 2-hole stopper provided with an inlet tube and a stirrer connected to a source of power for rotating the stirrer. Into the other of the outer openings was inserted a second 2-hole stopper but provided with a thermometer and an outlet tube. The outlet tube led to a pumping arrangement connected to said inlet tube which provided a means of externally circulating fluid contained in the flask. The center hole was adapted to receive the hollow steel cylinder, above described.

The test was conducted as follows:

The hollow steel cylinder was polished with emery cloth, washed with acetone, and air-dried. It was then treated either by immersing it in an aqueous alkaline quebracho composition prepared for use according to the invention or in an aqueous composition not so prepared for comparison purposes. The cylinder was immersed so that the exterior of the hollow cylinder was contacted thereby up to the circumferential mark by the composition. It was immersed therein at room temperature, raised to 175° F. during a period of 15 minutes and allowed to return to room temperature during a period of 45 minutes. The percent by weight of the material in the aqueous composition is set out in the table below.

Three percent by weight of a crude wax derived from petroleum was admixed with crude oil and the resulting mixture heated to between 150° and 160° F. until the wax was dissolved. 2500 milliliters of the oil having the wax thus added thereto was then placed in the 3-liter flask and the stirrer and the circulating means, as described above, put into operation.

The steel cylinder, as above treated in accordance with the invention, was then inserted in the center hole of the 3-liter flask, so that the closed end of the cylinder was in the flask and the stoppered end, as above described, extended outside of the flask. The cylinder was inserted to such depth in the oil in the flask that the circumferential mark on the cylinder was at the oil level. Water was then circulated through the cylinder by means of the inlet and outlet tubes leading to and from the constant temperature reservoir, described above, which was controlled at 90° F. The temperature of the interior of the steel cylinder was thereby maintained at 90° F. The oil containing the wax dissolved therein, thus placed in contact with the outer surface of the steel cylinder, was maintained at 120° F. by means of the constant temperature bath. The cooler steel cylinder, thus immersed in the warmer wax-containing oil, was maintained therein for a period of 2 hours.

The steel cylinder was then removed therefrom, detached from the water circulating lines, and immersed in a beaker containing 800 milliliters of water at 80° F. The cylinder was gently handled and no agitation in the water into which it was thus immersed was permitted thereby preventing disturbance of the deposit. The test sample was maintained in the 80° F. water for about 5 minutes. Adhering oil and a calculated portion of the adhering hydrocarbonaceous or "paraffin" material gradually left the surface of the cylinder. The cylinder was then removed and the percent oil-contacted surface of the cylinder, which became oil-free in the 80° F. water, was calculated. The results are set out in the table below.

*Table I*

| Test No. | Aqueous Surface-Treating Composition | | Percent Surface Area Free of Oil |
|---|---|---|---|
| | Inhibitor in Percent by Wt. | Alkaline Material In Percent by Wt. | |
| 1 | 0.000 | 0 | 0 |
| 2 | 0.000 | 5 NaOH | 5 |
| 3 | 0.000 | 5 KOH | 5 |
| 4 | 0.000 | 5 Na$_3$PO$_4$ | 5 |
| 5 | 0.000 | 5 Na$_2$CO$_3$ | 0 |
| 6 | 0.100 Gallic Acid | 0 | 30 |
| 7 | 0.100 Gallic Acid | 5 NaOH | 20 |
| 8 | 0.100 Tannic Acid | 0 | 15 |
| 9 | 0.100 Tannic Acid | 5 NaOH | 20 |
| 10 | 0.025 Quebracho | 0 | 0 |
| 11 | 0.100 Quebracho | 0 | 15 |
| 12 | 1.000 Quebracho | 0 | 55 |
| 13 | 0.025 Quebracho | 5 NaOH | 25 |
| 14 | 0.100 Quebracho | 1 NaOH | 60 |
| 15 | 0.100 Quebracho | 5 NaOH | 85 |
| 16 | 1.000 Quebracho | 0.5 NaOH | 45 |
| 17 | 1.000 Quebracho | 1 NaOH | 85 |
| 18 | 1.000 Quebracho | 5 NaOH | 95 |
| 19 | 1.000 Quebracho | 10 NaOH | 95 |
| 20 | 0.025 Quebracho | 5 Na$_3$PO$_4$ | 20 |
| 21 | 0.100 Quebracho | 1 Na$_3$PO$_4$ | 50 |
| 22 | 0.100 Quebracho | 5 Na$_3$PO$_4$ | 80 |
| 23 | 1.000 Quebracho | 2 Na$_3$PO$_4$ | 95 |
| 24 | 1.000 Quebracho | 5 Na$_3$PO$_4$ | 95 |
| 25 | 1.000 Quebracho | 10 Na$_3$PO$_4$ | 95 |
| 26 | 0.100 Quebracho | 5 KOH | 50 |
| 27 | 0.025 Quebracho | 5 Na$_2$CO$_3$ | 20 |
| 28 | 0.100 Quebracho | 5 Na$_2$CO$_3$ | 90 |

An examination of the table shows that the tests in which the exterior surface of the metal cylinder was treated with an aqueous alkaline quebracho dispersion increased the area thereof which became free of oil when gently submerged in water in accordance with the test. It also shows that neither quebracho nor an alkaline substance alone in water is satisfactory. It further shows that at least about 0.1 percent quebracho and at least about 1.0 percent by weight of the OH-yielding substance in water, e.g., NaOH or $Na_3PO_4$, was necessary for consistently good results. From 0.1 percent quebracho and from 1 to 10 percent, and preferably from 5 to 10 percent, of NaOH, KOH, $Na_3PO_4$, or $Na_2CO_3$ gave best results. These results are clearly in contrast to the small area or entire absence of any area of the cylinder which became free of oil upon submergence in water when not treated in accordance with the invention.

Greater amounts of quebracho than 1.0 percent could be employed, but 1.0 percent is highly effective and the use of greater amounts thereof does not appear justified. It is recommended that the alkaline substance, i.e., one yielding OH ions in solution be the hydroxide, carbonate, or phosphate of an alkali metal.

The following examples are illustrative of the treatment of well tubing in oil wells in accordance with the invention.

*Example 1*

One well, A, was not treated according to the invention but was observed for the purposes of comparison. Another well, B, was treated according to the invention.

Adjacent producing wells, A and B, of almost identical depth, in the same producing field, each provided with similar equipment, and all having long histories of paraffin build-up in the tubing thereof, were selected for treatment and/or observation for the purpose of illustrating the practice of the invention.

The two wells were taken out of production and the accumulated "paraffin build-up" therein removed by flushing the tubing with hot lease oil (crude oil produced in the field). The lease oil was heated to a temperature of between 300° and 390° F. and pumped down the annulus between the tubing and casing and thence upwardly through the tubing. About 1½ hours were required to remove the paraffin build-up in each of the wells.

Well A was not treated according to the invention and was put back into production after the hot oil treatment.

Well B was treated according to the invention. Following the hot-oil treatment, 275 gallons of lease oil heated to 150° F. were pumped down the tubing followed by 250 gallons of an aqueous dispersion containing 250 pounds of dissolved trisodium phosphate and 18 pounds of dispersed quebracho at 175° F. The aqueous dispersion of the trisodium phosphate and quebracho was pumped down the tubing at a rate of 21 gallons per minute. The well was then shut in for 1 hour while the aqueous solution remained in contact with the tubing. The aqueous dispersion was then pumped out of the well tubing. The following day the well was put back into production. At that time about 4 gallons of a more concentrated aqueous dispersion of quebracho than that employed in the substantially oil-free tubing, was then prepared by admixing 6.8 pounds of quebracho and 3.6 pounds of sodium hydroxide in 18.3 pounds of water to which was added 4.2 pounds of methyl alcohol, pumped down the annulus, and fed into the tubing near the bottom thereof. (The methyl alcohol was added for the purpose of lowering the freezing point.) This same quantity was made up and pumped into the well each day thereafter as an added precaution against deposition and adherence of hydrocarbonaceous solids to the tubing of the well.

Each of the two wells continued in production for 25 days. At the end of this period, the wells were taken out of production and paraffin knives, weighing approximately 2 to 3 pounds each and having a diameter which was about ⅛-inch less than the 2-inch diameter of well tubing were suspended by suitable cables and dropped into the tubing in accordance with known practice. The extent of the paraffin build-up was ascertained by the ease or difficulty with which the knives, thus dropped into the well, descended. If the knife dropped freely as it was run into the well, that section of the tubing was designated "free" of paraffin. In those instances wherein the knife dropped freely for an appreciable number of feet, then dropped slowly for a number of feet, and then dropped freely again for a relatively larger number of feet, and continued such irregular or alternate descent, the paraffin deposit therein was designated "spotty." In those instances wherein the knife fell continuously slowly down the tubing, "some" paraffin was designated. In severe paraffin build-ups where the knife stopped or substantially stopped and it was necessary to withdraw it some distance toward the top of the well and drop it one or more times in order to achieve penetration of the paraffin build-up, the paraffin build-up in such sections of the tubing were designated "heavy" paraffin deposits.

An evaluation of the paraffin build-up in the two wells showed the following results:

Well A: "some" paraffin build-up in the upper 500 feet, "heavy" paraffin build-up between 500 and 1100 feet, and "some" paraffin build-up between 1100 and 1500 feet.

Well B: "free" of paraffin build-up in the upper 1200 feet, "some" paraffin build-up between 1200 and 1500 feet, and "spotty" paraffin build-up between 1500 and 1800 feet.

The results of the inspection of the two wells showed that the paraffin build-up in Well A was definitely greater than in Well B.

At the end of 20 additional days, i.e., a total of 45 days from the start of the treatment and/or observation of the wells, the wells were again "knifed" as described above and showed the following results:

Well A: substantially the same high paraffin build-up as was shown to exist when tested at the end of 25 days following removal of the paraffin as set out above.

Well B: The top 1200 feet were "free" of paraffin and the distance therebelow to 1900 feet "spotty" build-up. In general, there was less paraffin accumulation encountered during the second inspection than encountered in the previous inspection of Well B.

Both wells continued in production but the treatment of Well B was thereafter discontinued. At the end of an additional 20 days, both the wells were again inspected by the knifing technique. At that time the results showed:

Well A: a hard "heavy" deposit down to 1450 feet.

Well B: some paraffin but it was soft, as evidenced by the knife dropping easily therethrough.

After another period of 20 days, i.e., a total of 86 days from the date of the hot oil paraffin removal, the wells were again inspected and showed the following results:

Well A: a hard "heavy" continuous build-up from the top of the well to a depth of 1850 feet.

Well B: a hard "spotty" build-up from the surface to a depth of 1375 feet.

At the end of an additional 51 days, i.e., a total of 137 days, the wells were again inspected and showed the following results:

Well A: a hard continuous "heavy" build-up to a depth of 2000 feet.

Well B: a hard continuous deposit to a depth of 2150 feet.

It is apparent from a study of the inspection of the wells following the oil removal of paraffin from the tubing of both Well A, which was untreated, and Well B treated according to the invention for a period of 45 days that the accumulation of hydrocarbonaceous solids, usually referred to broadly as paraffin build-up were definitely inhibited in Well B. The results of the inspections following cessation of treatment of Well B shows that both wells were substantially equally susceptible to paraffin deposits and it was only due to the effects of the earlier treatment in accordance with the invention that prevented the deposits from Well B from being equally as severe as those in Well A. It was only after the inhibiting effect of the alkaline quebracho dispersion had been exhausted that Well B showed marked build-up of hydrocarbonaceous material.

*Example 2*

Two more wells herein designated Well D and Well E, were chosen for further study to demonstrate superiority of the practice of the invention over a known method practice to inhibit paraffin build-up. These wells were adjacent wells located in the same section and block in a Texas oil-producing field.

They were each approximately 3070 feet deep, and producing from a zone located between 2988 and 3069 feet. They were each producing 23 barrels of oil per day, of 30° to 40° API gravity paraffin-base crude. They were each cased with 4½-inch casing perforated at the producing zone. They each contained 1¼-inch tubing and were operated by ½-inch sucker rods. Previous histories of the wells showed that paraffin formed in both of the wells at approximately 175 feet off the bottom and upward at substantially the same rate and extent. Well E was treated according to the invention and Well D was not so treated but was treated according to a known recommended procedure for inhibiting paraffin build-up and was observed for purposes of comparison. Both wells were provided with new equipment at the beginning of the treatment or the observation period for the purposes of demonstrating the effectiveness of the invention, except that the rods employed in Well D had been painted whereas the rods of Well E were without paint. Well D was not given further treatment before putting it back into production. Well E was treated according to the invention by injecting into the well tubing an aqueous dispersion consisting of 5 percent trisodium phosphate and 1 percent quebracho heated to 175° F. in accordance with the practice of the invention. The aqueous solution was pumped down the tubing to contact the interior of the tubing with the solution, and allowed to remain in contact with the tubing for 4 hours and then pumped out. Thereafter both wells were put back into production.

Both wells were then subjected to subsequent treatment, Well D by injecting daily, down the annulus and into the tubing, one gallon of carbon disulfide, a well-known and intensively used paraffin solvent in oil-producing wells. Well E was treated daily by similarly injecting down the annulus and into the tubing 1 gallon of an aqueous dispersion consisting of 0.83 pound of quebracho and 0.21 pound of sodium hydroxide in water in accordance with the invention.

After a little over 3 months, Well D, despite the daily treatment with carbon disulfide, was plugged up completely due to the hydrocarbonaceous or "paraffin" deposits on the tubing. The well had to be shut down at that time and the tubing cleaned mechanically before the production from the well could be resumed.

At the last inspection available for Well E, which was about 8 months after its being put back into production after treatment according to the invention and during which time the subsequent treatment in accordance with the invention was continued, the well was still pumping satisfactorily with no trouble from any hydrocarbonaceous deposits on the tubing.

An evaluation of the treatment of Wells B and E which were treated according to the invention in contrast to Wells A and D which were not so treated conclusively shows the effectiveness of the practice of the invention for the prevention or inhibition of the formation of adhering and troublesome hydrocarbonaceous deposits on the walls of the tubing of wells producing from "paraffin"-containing oil.

A number of advantages are apparent from the practice of the invention prominent among which is effectively avoiding, at low cost and at relatively small inconvenience, the serious adverse effects on production rates and operating expenses due to the deposition and adhesion of hydrocarbonaceous solids on the walls of equipment coming in contact with oil containing such hydrocarbonaceous material in solution or suspension for protracted periods of time. When adequate preventive steps are not taken as illustrated by the invention, relatively frequent shut-down, time-consuming, and costly removal steps must be taken to dissolve and flush out or mechanically scrape away the adhering hydrocarbonaceous deposition.

Having described the invention, what is claimed and desired to be protected by Letters Patent is:

1. The method of inhibiting the adhesion of solid hydrocarbonaceous material deposited from oil containing such substances in solution and suspension on a deposition-susceptible surface of equipment with which such oil comes in contact consisting of subjecting the surfaces thus contacted to the action of an alkaline aqueous dispersion of a small but effective amount of quebracho.

2. The method of inhibiting the adhesion of solid hydrocarbonaceous material deposited from oil containing such substances in solution and suspension on a deposition-susceptible surface of equipment with which such oil comes in contact consisting of subjecting the surface thus contacted with an aqueous dispersion containing at least about 0.1 percent of quebracho and at least about 1.0 percent of a substance yielding OH ions in an aqueous medium and thereafter periodically admixing at least about 1 gallon of said dispersion per 100 barrels of oil brought in contact with said surfaces.

3. The method of claim 2 wherein the substance yielding OH ions in an aqueous medium is NaOH.

4. The method of claim 3 wherein the NaOH is present in an amount of between 1.0 and 10.0 percent by weight of said aqueous dispersion.

5. The method of inhibiting hydrocarbonaceous substances suspended and dissolved in oil from depositing as hard tenaciously adhering solids on the walls of equipment with which such oil comes in contact, consisting essentially of the steps of substantially removing adhering foreign substances from said surfaces, flushing said surfaces thus freed from such foreign substances with an aqueous dispersion compriing between 0.1 and 5.0 percent of quebracho and between 1.0 and 10.0 percent of an alkaline substance selected from the class consisting of hydroxides, carbonates, and phosphates of alkali metals.

6. The method of claim 5 wherein the surface from which adhering foreign substances have been removed is treated with an aqueous alkaline solution equivalent to at least a 5 percent solution of NaOH to render the surfaces water-wettable prior to subjecting the said surfaces to the action of said aqueous dispersion comprising said quebracho and alkaline substance.

7. The method of inhibiting the adhesion of solid hydrocarbonaceous substances deposited from oil containing such substances in solution and suspension on the inner surfaces of pipes and vessels contacted by said oils which consists of admixing with said oil an aqueous dispersion, consisting essentially of between 0.1 and 2.5 pounds of quebracho, and sufficient alkaline material to give a pH value of at least about 8, per gallon of dispersion, in an amount of said dispersion of between 0.2 and 20.0 gallons thereof per 100 barrels of oil periodically between about 12 and 72 hour intervals.

References Cited in the file of this patent

UNITED STATES PATENTS

| | | |
|---|---|---|
| 1,873,083 | Walker | Aug. 23, 1932 |
| 1,892,205 | DeGroote | Dec. 27, 1932 |
| 2,560,930 | Campise | July 17, 1951 |
| 2,771,420 | Rowe | Nov. 20, 1956 |
| 2,828,258 | Thompson | Mar. 25, 1958 |
| 2,927,078 | Nathan | Mar. 1, 1960 |